United States Patent
Loke et al.

(10) Patent No.: US 11,247,651 B2
(45) Date of Patent: Feb. 15, 2022

(54) HYDRAULIC UNIT FOR GENERATING BRAKE PRESSURE FOR A HYDRAULIC BRAKE SYSTEM

(71) Applicant: Continental Teves AG & Co. OHG, Frankfurt am Main (DE)

(72) Inventors: Jörg Loke, Brechen (DE); Horst Krämer, Ginsheim-Gustavsburg (DE); Manfred Rüffer, Sulzbach (DE); Andreas Bischoff, Frankfurt am Main (DE); Sascha Gerber, Bad Schwalbach (DE); Ingo Knewitz, Neu Anspach (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 16/868,928

(22) Filed: May 7, 2020

(65) Prior Publication Data
US 2020/0262404 A1 Aug. 20, 2020

Related U.S. Application Data

(63) Continuation of application No. PCT/EP2018/078180, filed on Oct. 16, 2018.

(30) Foreign Application Priority Data

Nov. 14, 2017 (DE) ...................... 10 2017 220 206.8

(51) Int. Cl.
*B60T 11/20* (2006.01)
*F15B 15/14* (2006.01)
*B22D 25/02* (2006.01)

(52) U.S. Cl.
CPC .......... *B60T 11/20* (2013.01); *F15B 15/1428* (2013.01); *B22D 25/02* (2013.01)

(58) Field of Classification Search
CPC .......... B60T 11/20; B60T 11/26; B60T 11/22; B60T 11/224; B60T 11/236; F15B 7/08; F15B 15/1428; B22D 25/22
(Continued)

(56) References Cited

U.S. PATENT DOCUMENTS

| 3,213,626 A | 10/1965 | Shutt et al. |
| 2004/0079078 A1 | 4/2004 | Bacardit et al. |

(Continued)

FOREIGN PATENT DOCUMENTS

| CN | 1807163 A | 7/2006 |
| CN | 103661346 A | 3/2014 |

(Continued)

OTHER PUBLICATIONS

Search Report dated Oct. 25, 2018 from corresponding German Patent Application No. DE 10 2017 220 206.8.
(Continued)

*Primary Examiner* — Abiy Teka
*Assistant Examiner* — Daniel S Collins

(57) ABSTRACT

A hydraulic unit for generating brake pressure for a hydraulic brake system, comprising a housing which is produced from a cast blank, wherein the cast blank has at least one receiving cavity which is provided for machining to form a receiving profile for sealingly receiving a connecting piece, which is connected to a fluid container and can be plugged into the receiving profile along a plug-in axis, wherein the housing comprises at least one piston bore for receiving at least one piston, which is driven along a piston bore axis into the cast blank.

9 Claims, 2 Drawing Sheets

(58) Field of Classification Search
 USPC .......................................................... 60/585
 See application file for complete search history.

(56) References Cited

U.S. PATENT DOCUMENTS

| 2005/0066656 | A1* | 3/2005 | Ogiwara ............... B60T 8/4081 60/562 |
|---|---|---|---|
| 2006/0174619 | A1 | 8/2006 | Mouri et al. |
| 2015/0113977 | A1 | 4/2015 | Larequi et al. |
| 2018/0170336 | A1 | 6/2018 | Brandt et al. |

FOREIGN PATENT DOCUMENTS

| CN | 104245449 | A | | 12/2014 | |
|---|---|---|---|---|---|
| DE | 1505460 | A1 | | 8/1969 | |
| DE | 2820299 | A1 | | 11/1979 | |
| DE | 4024483 | | * | 2/1992 | .............. B60T 11/16 |
| DE | 102004057137 | A1 | | 8/2005 | |
| JP | 2004521799 | A | | 7/2004 | |
| JP | 2014024420 | A | | 2/2014 | |
| JP | 2017144816 | A | | 8/2017 | |
| KR | 20080093259 | A | | 10/2008 | |
| WO | 92/02732 | A1 | | 2/1992 | |
| WO | 2017/001282 | A1 | | 1/2017 | |

OTHER PUBLICATIONS

International Search Report and Written Opinion dated Feb. 19, 2019 from corresponding International Patent Application No. PCT/EP2018/078180.

Notice of Allowance dated Sep. 22, 2021 from corresponding Japanese patent application No. JP 2020-524792.

Office Action dated Nov. 26, 2021 from corresponding Chinese patent application No. CN 201880072071.9.

* cited by examiner

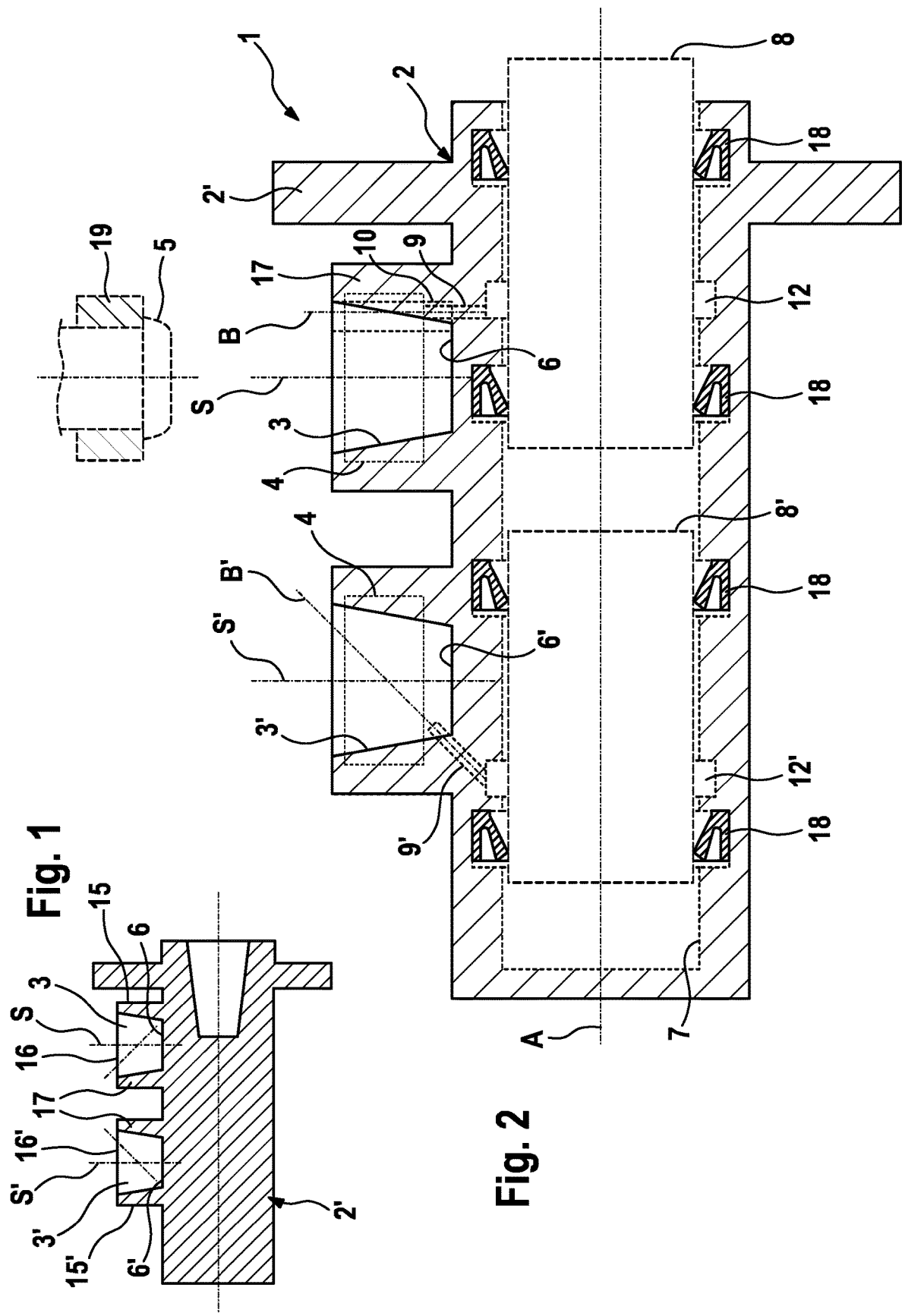

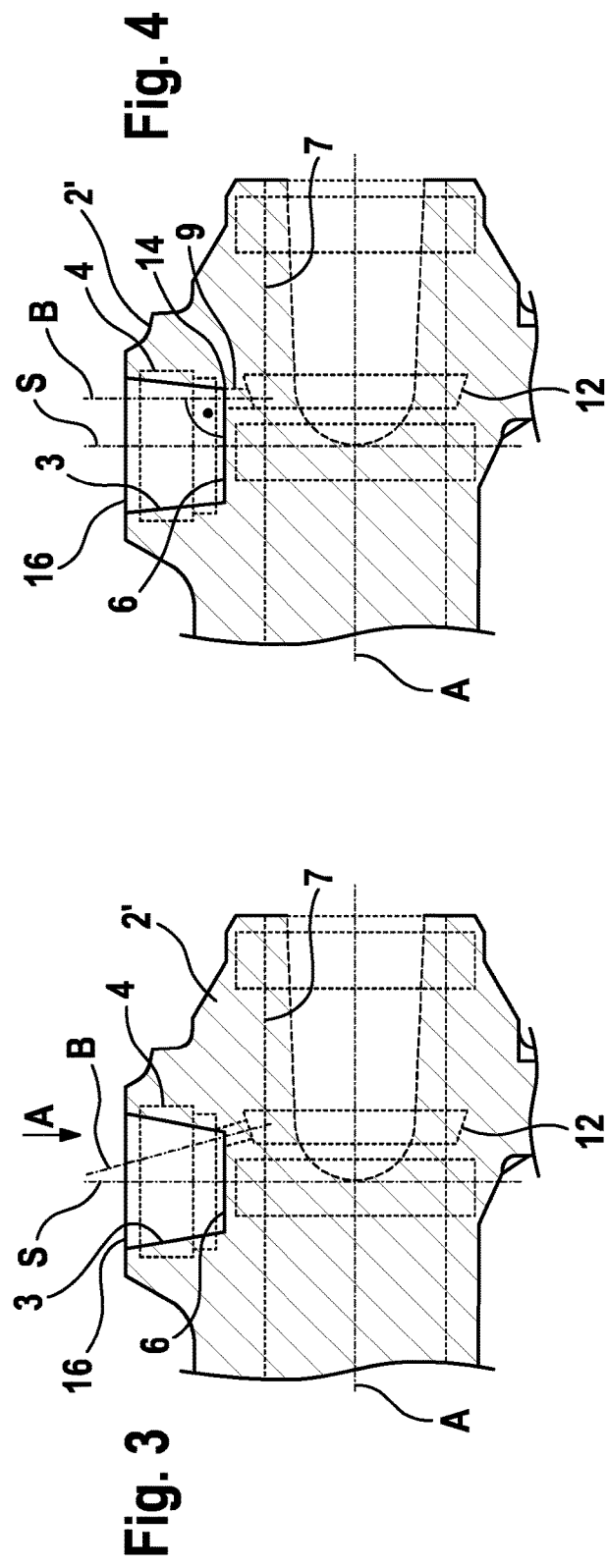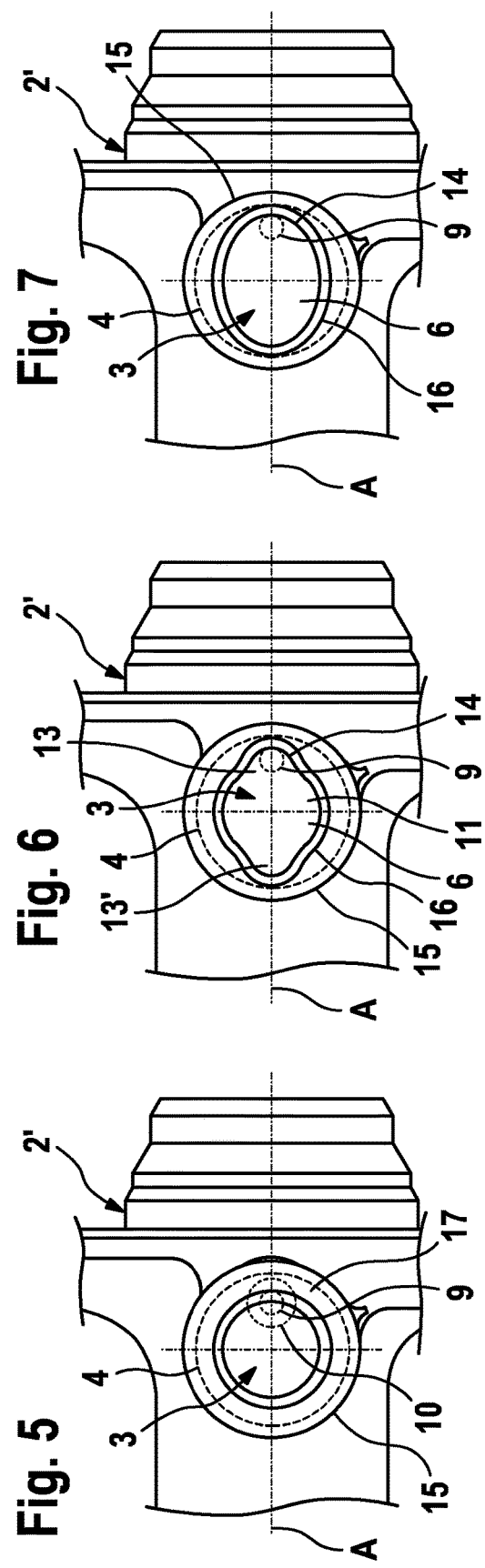

HYDRAULIC UNIT FOR GENERATING BRAKE PRESSURE FOR A HYDRAULIC BRAKE SYSTEM

CROSS REFERENCE TO RELATED APPLICATIONS

This application claims priority to PCT International Application No. PCT/EP2018/078180, filed Oct. 16, 2018, which claims priority to German Patent Application No. DE 10 2017 220 206.8, filed Nov. 14, 2017, wherein the contents of such applications are incorporated herein by reference.

TECHNICAL BACKGROUND

The housings of such units are normally produced from light metal alloys. Here, it is commonly the case that a cast blank is firstly generated by primary forming—for example by permanent mold casting. A cast blank generated in this way initially has, owing to the production process, relatively coarse dimensional and surface tolerances and is thereafter provided with required functional elements and profiles with close tolerances, such as, for example, various ports, connecting channels, bores, sealing surfaces, grooves and the like, by means of machining methods, and is possibly subsequently coated with a protective layer.

It is thus known to provide the cast blank with receiving cavities for subsequently receiving connecting pieces of a fluid container, said receiving cavities after casting being machined—for example by drilling, milling or hollowing out by turning—with a specific receiving profile for the sealing contact of a connecting piece seal.

The receiving cavity is connected via a connecting bore with what is referred to as a replenishing groove—a radial inside groove in the lateral surface of the piston bore, which serves for uniformly wetting the outer surface of the piston with brake fluid from the fluid container. Technology dictates that such a connecting bore is normally produced before the receiving cavity is hollowed out by turning. A constant desire to shorten that part of the master brake cylinder which protrudes into the engine cavity and to configure same to be ever more compact leads to a design meaning that the replenishing groove is unable to be arranged directly below the associated receiving cavity and has to be arranged ever further away axially. The connecting bore consequently either has to be drilled obliquely or firstly a larger pilot bore with rough tolerances is produced through part of the wall of the receiving cavity. The connecting bore with close tolerances is then produced in the pilot bore.

The associated tool changes, rechucking or positional changes of the cast blank along with long residence periods in the tool magazines considerably increase the production costs.

What is needed is a hydraulic assembly which is improved and in particular optimized in terms of production technology.

BRIEF DESCRIPTION OF THE DRAWINGS

FIG. 1 shows by way of example, not true to scale and in greatly simplified form, a typical cast blank of the type in question of a tandem master brake cylinder in an unprocessed state in a sectional illustration.

FIG. 2 likewise shows in greatly simplified form the housing of a tandem master brake cylinder of the type in question with elements indicated which are produced by machining, with a known oblique connecting bore and a further known connecting bore arranged in a pilot bore, and a number of components of the hydraulic unit, in axial section.

FIG. 3 shows an enlarged detail of the cast blank in the region of the receiving cavity with elements indicated which are produced by machining, and with a known oblique connecting bore, in axial section.

FIG. 4 shows a view according to FIG. 3, but with a first embodiment according to the invention of the receiving cavity.

FIG. 5 shows a further known embodiment with a connecting bore arranged in a pilot bore, in top view.

FIG. 6 shows a first embodiment according to the invention of the receiving cavity in top view.

FIG. 7 shows a further embodiment according to the invention of the receiving cavity in top view.

DETAILED DESCRIPTION OF THE EMBODIMENTS

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments.

In the example shown, a cast blank 2' of a tandem master brake cylinder is shown. The cast blank 2' is generally produced from an aluminum alloy by permanent mold casting and is subsequently provided with required profiles and functional elements by machining and is thereby converted into a processed housing 2, as indicated in particular in FIG. 2. The cast blank 2' is provided with a first receiving cavity 3 and a second receiving cavity 3', which are substantially cup-shaped with an opening 16 and a flat base 6, 6'. The two receiving cavities 3, 3' are each arranged in a first elevation 15 and a second elevation 15' protruding outward transversely with respect to a piston bore axis A, as a result of which said receiving cavities are each enclosed radially by a wall 17 of limited thickness.

FIG. 2 shows a number of components of a hydraulic unit 1 of the type in question in the form of a tandem master brake cylinder with a processed housing 2, wherein the elements produced by machining are illustrated by dashed lines. A sack-shaped piston bore 7 is arranged in the housing 2 along a piston bore axis A. A first piston 8 and a second piston 8' are accommodated displaceably in a tandem construction in the piston bore 7 and in a manner sealed in relation to the piston bore 7 by piston seals 18.

A first radial inside groove 12 and a second radial inside groove 12', which are provided in the lateral surface of the piston bore 7, each surround one of the pistons 8, 8' and serve for the uniform distribution of brake fluid.

The receiving cavities 3, 3' are extended, by machining the original cup shape, to form a respective receiving profile 4, 4', which is rotationally symmetrical about the plug-in axis S. The receiving profiles 4, 4' each accommodate a connecting piece 5 of a fluid container, not shown, together with the connecting piece seal 19, which are plugged in along the plug-in axis. The connecting bores 9, 9' connect the receiving cavities 3, 3' with the associated radial inside grooves 12, 12' in order to feed the piston bore 7 with brake fluid from the fluid container.

Since the two radial inside grooves 12, 12' are not located directly below the flat base 6, 6' of the receiving cavities 3, 3', but rather are positioned offset along the piston axis A, the second connecting bore 9' is drilled obliquely, not parallel to the plug-in axis S. The first connecting bore 9 which is oriented parallel to the plug-in axis S is positioned in a separate, sack-shaped, large pilot bore 10 which has previously been bored partially into the wall 17 of the receiving cavity 3.

The structural solution illustrated in FIG. 2 with an oblique connecting bore 9 is shown in enlarged form in FIG. 3 with reference to a further exemplary embodiment.

FIG. 4 shows a first embodiment according to the invention. As can be gathered in particular from FIGS. 6 and 7, the receiving cavity 3 is stretched along the piston bore axis A, and therefore it has a greater extent along the piston bore axis A than in the transverse direction. With the stretching of the receiving cavity 3, the base 6 thereof is also elongated along the piston bore axis A. The connecting bore 9 is positioned in a manner offset with respect to the outer edge 14 of the base 6 and is drilled directly into the base 6 orthogonally with respect thereto; in the process, it meets the associated radial inside groove 12.

The structural solution illustrated in FIG. 2 with a connecting bore 9 positioned in the pilot bore 10 is shown in top view in FIG. 5 with reference to a further exemplary embodiment. The receiving cavity 3 is configured to be rotationally symmetrically circular in cross section. The pilot bore 10 which is significantly larger than the connecting bore 9 is drilled in the receiving cavity 3 in order to provide a required contact surface for the connecting bore 9, the drilling tool of which, because of the close tolerances and smaller diameter, must not be exposed to any transverse forces, as would arise during the partial drilling of the wall 17.

FIG. 6 shows a first embodiment according to the invention of the receiving cavity 3 in top view. In contrast to the known embodiment according to FIG. 5, the receiving cavity 3 according to the invention is non-circular in its section transversely with respect to the plug-in axis S and is stretched along the piston bore axis A. The edge 14 of the base 6 follows the cross-sectional profile of the receiving cavity 3.

The base 6 and therefore also the cross-sectional profile of the receiving cavity 3 have a substantially round basic shape 11, to which two extension surfaces 13, 13' are connected and therefore extend the base 6 and thus also the cross-sectional profile of the receiving cavity 3 along the piston bore axis A. The connecting bore 9 is positioned here in the extension surface 13.

The basic shape 11 can also have a noncircular shape within the invention, such as comparable to an ellipse, a polygon with rounded corners and the like.

FIG. 7 shows a further embodiment according to the invention. In contrast to the embodiment according to FIG. 6, the base 6 and therefore also the cross-sectional profile of the receiving cavity 3 are provided in substantially elliptical form. The connecting bore 9 is positioned here on the main axis of the ellipse in the vicinity of an apex point.

The embodiments make provision for the receiving cavity, and in particular the base thereof, to be non-circular in its cross section and to stretch along the piston bore axis.

The cross section and the base can be provided here on the basis of various embodiments according to the invention, for example in substantially elliptical form, or can have a substantially elliptical or round basic shape with at least one extension surface, which is connected to the basic shape along the piston bore axis and is provided in narrower form transversely with respect to the piston bore axis than the basic shape.

A casting contour configured in such a manner makes it possible for the base of the receiving cavity to be effectively enlarged and thus to provide an optimized contact surface for vertical support of the drilling tool. An orthogonal connecting bore is thus drilled directly into the base, in a manner offset with respect to the edge thereof, with close tolerances being maintained. An additional pilot bore or an oblique bore can be dispensed with. Processing times and costs are significantly reduced as a result of the associated avoidance of tool changes and rechucking and the reduced machining volume.

A surprising side effect is that the cast blank also weighs less and material costs are reduced because of the reduced casting volume.

The embodiments can be used in the case of the housing of a tandem master brake cylinder in order to realize a large axial offset, which promotes compactness, of the radially inside groove relative to the associated receiving cavity. The invention furthermore claims a hydraulic motor vehicle brake system which is equipped with a hydraulic unit according to the invention.

LIST OF REFERENCE SIGNS

1 Hydraulic unit
2 Housing
2' Cast blank
3 Receiving cavity
4 Receiving profile
5 Connecting piece
6 Base
7 Piston bore
8 Piston
8' Piston
9 Connecting bore
10 Pilot bore
11 Basic shape
12 Radially inside groove
13 Extension surface
14 Edge
15 Elevation
16 Opening
17 Wall
18 Piston seal
19 Connecting piece seal
A Piston bore axis
B Bore axis
S Plug-in axis

The invention claimed is:

1. A hydraulic unit for generating brake pressure for a hydraulic brake system, the hydraulic unit comprising:
   a housing which is produced from a cast blank, wherein the cast blank has at least one receiving cavity which is provided for machining to form a receiving profile for sealingly receiving a connecting piece, which is connected to a fluid container and can be plugged into the receiving profile along a plug-in axis;
   wherein the housing comprises at least one piston bore for receiving at least one piston, which is driven along a piston bore axis into the cast blank; and
   wherein the receiving cavity is non-circular in a section transversely with respect to the plug-in axis and is stretched along the piston bore axis.

2. The hydraulic unit as claimed in claim 1, wherein the receiving cavity is cup-shaped with an opening and a base, and the base is flat and non-circular and is stretched along the piston bore axis.

3. The hydraulic unit as claimed in claim 2, wherein the base is provided in elliptical form.

4. The hydraulic unit as claimed in claim 2, wherein the base has a elliptical or round basic shape with at least one extension surface, which is connected to the basic shape along the piston bore axis and is provided in narrower form transversely with respect to the piston bore axis than the basic shape.

5. The hydraulic unit as claimed in claim 2, wherein the housing has a connecting bore for hydraulically connecting the receiving cavity to the piston bore which is bored directly into the base and is oriented orthogonally with respect thereto.

6. The hydraulic unit as claimed in claim 5, wherein the connecting bore opens into a radially inside groove which is arranged in a lateral surface of the piston bore.

7. The hydraulic unit as claimed in claim 1, wherein the receiving cavity is arranged in an elevation protruding outward on the cast blank transversely with respect to the piston bore axis.

8. The hydraulic unit as claimed in claim 1, wherein the cast blank is produced from an aluminum alloy by permanent mold casting.

9. The hydraulic unit as claimed in claim 1, wherein the unit is a master brake cylinder with a first piston and a second piston arranged one behind the other in a tandem construction in the piston bore.

\* \* \* \* \*